US012647901B2

(12) United States Patent
Pruikkonen

(10) Patent No.: US 12,647,901 B2
(45) Date of Patent: Jun. 2, 2026

(54) POWER MANAGEMENT IN TRANSMITTERS

(71) Applicant: Nordic Semiconductor ASA, Trondheim (NO)

(72) Inventor: Antti Pruikkonen, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 497 days.

(21) Appl. No.: 18/140,507

(22) Filed: Apr. 27, 2023

(65) Prior Publication Data

US 2023/0362827 A1 Nov. 9, 2023

(30) Foreign Application Priority Data

May 4, 2022 (GB) ..................................... 2206519

(51) Int. Cl.
*H04W 52/18* (2009.01)
*H04L 12/10* (2006.01)
(52) U.S. Cl.
CPC ............. *H04W 52/18* (2013.01); *H04L 12/10* (2013.01)
(58) Field of Classification Search
CPC ............................... H04W 52/18; H04L 12/10
See application file for complete search history.

(56) References Cited

U.S. PATENT DOCUMENTS 7,539,882 B2 * 5/2009 Jessup ................... G06F 1/3234
700/286
7,613,939 B2 * 11/2009 Karam .................... H04L 12/10
710/305

(Continued)

FOREIGN PATENT DOCUMENTS

EP 3337248 A1 * 6/2018 ........ H04W 52/0251
EP 4063552 B1 * 11/2024 ............. D06F 34/14
(Continued)

OTHER PUBLICATIONS

IPO Combined Search and Examination Report under Sections 17 and 18(3) for GB2206519.7, dated Oct. 7, 2022, 8 pages.

(Continued)

*Primary Examiner* — Hai V Nguyen
(74) *Attorney, Agent, or Firm* — Klarquist Sparkman, LLP

(57) ABSTRACT

A transmitter device includes a power supply, a power supply assessment module, a transmission power assessment module, and a data transmission module. The power assessment module assesses the present power delivery capability of the power supply. The transmission power assessment module assesses the power required for successful data transmission to an external communication party. The transmitter device compares the present power delivery capability to the power required for successful data transmission. If the comparison indicates that the present power delivery capability of the power supply is such that the power supply is able to supply sufficient power for successful data transmission, the transmitter device initiates data communication. If the comparison indicates that the present power delivery capability of the power supply is such that the power supply is not able to supply sufficient power for successful data transmission, the transmitter device does not initiate data communication.

20 Claims, 6 Drawing Sheets

(56) References Cited

U.S. PATENT DOCUMENTS

| | | | | |
|---|---|---|---|---|
| 9,374,787 | B2 * | 6/2016 | de Lind van Wijngaarden | G06F 1/3206 |
| 9,461,688 | B2 * | 10/2016 | Callaway, Jr. | H04W 28/14 |
| 9,721,210 | B1 * | 8/2017 | Brown | G05F 5/00 |
| 9,791,910 | B1 * | 10/2017 | Brown | G06F 1/324 |
| 9,877,651 | B2 * | 1/2018 | Watson | A61B 5/02438 |
| 9,935,605 | B2 * | 4/2018 | Nikitin | H01F 38/14 |
| 10,285,135 | B2 * | 5/2019 | Bernhard | H04L 69/22 |
| 10,432,473 | B2 * | 10/2019 | Cencini | H02M 3/158 |
| 10,474,213 | B1 * | 11/2019 | Brown | G06F 1/3296 |
| 10,542,477 | B2 * | 1/2020 | Johnston | H04W 4/70 |
| 10,578,483 | B2 * | 3/2020 | Ahmed | G01J 1/0247 |
| 10,834,676 | B2 * | 11/2020 | Lindoff | H04B 7/022 |
| 11,567,561 | B2 * | 1/2023 | Elboim | G06F 1/329 |
| 11,874,416 | B2 * | 1/2024 | Iqbal | G01V 1/162 |
| 11,936,413 | B1 * | 3/2024 | Zalewski | H02N 11/002 |
| 12,302,473 | B2 * | 5/2025 | Vermeer | H04L 12/10 |
| 12,375,882 | B2 * | 7/2025 | Volkerink | H02J 7/005 |
| 2007/0032733 | A1 * | 2/2007 | Burton | A61B 5/7264 600/509 |
| 2007/0220280 | A1 * | 9/2007 | Karam | H04L 12/10 713/300 |
| 2011/0222419 | A1 * | 9/2011 | Callaway, Jr. | H04L 47/748 370/252 |
| 2015/0257643 | A1 * | 9/2015 | Watson | A61B 5/02438 600/324 |
| 2016/0366649 | A1 * | 12/2016 | Bernhard | H04W 52/0277 |
| 2017/0126505 | A1 * | 5/2017 | Cencini | G06K 19/06028 |
| 2018/0167864 | A1 * | 6/2018 | Johnston | H04W 4/70 |
| 2019/0178710 | A1 * | 6/2019 | Ahmed | G06F 1/3203 |
| 2019/0204900 | A1 * | 7/2019 | Nair | G06F 1/3287 |
| 2019/0230594 | A1 * | 7/2019 | Lindoff | H04W 52/0277 |
| 2021/0020012 | A1 * | 1/2021 | Shakedd | G08B 13/2448 |
| 2021/0027608 | A1 * | 1/2021 | Shakedd | G08B 21/24 |
| 2023/0044564 | A1 * | 2/2023 | Jezewski | G06F 40/30 |
| 2024/0333029 | A1 * | 10/2024 | Xiong | H04W 52/0261 |
| 2024/0373359 | A1 * | 11/2024 | Mazloum | H04W 52/0235 |
| 2025/0240863 | A1 * | 7/2025 | Vermeer | H04L 12/10 |

FOREIGN PATENT DOCUMENTS

| | | | | |
|---|---|---|---|---|
| WO | WO 2011/112909 | A2 | 9/2011 | |
| WO | WO-2018059692 | A1 * | 4/2018 | H04W 52/028 |
| WO | WO 2019/113417 | A1 | 6/2019 | |
| WO | WO 2023/017160 | A1 | 2/2023 | |
| WO | WO 2023/031033 | A1 | 3/2023 | |

OTHER PUBLICATIONS

Zhang et al., "Study on the Characteristics of a High Capacity Nickel Manganese Cobalt Oxide (NMC) Lithium-Ion Battery—An Experimental Investigation," *MDPI, Energies*, vol. 11, Issue 9, Aug. 2018, 20 pages.

Nordic Semiconductor, "Evaluating connection parameters %CONEVAL," downloaded from https://infocenter.nordicsemi.com/topic/ref_at_commands/REF/at_commands/mob_termination_ctrl_status/coneval.html, first published on May 7, 2021, 1 page.

* cited by examiner

Time

POWER MANAGEMENT IN TRANSMITTERS

CROSS-REFERENCE TO RELATED APPLICATION

This application claims priority to Great Britain Application No. 2206519.7, filed May 4, 2022, which application is incorporated herein in its entirety.

TECHNICAL FIELD

The present invention relates to a transmitter device and a method of operating a transmitter device.

BACKGROUND

In circumstances in which the power supply of an electronic device (e.g. a radio transceiver) is compromised the problem arises that an attempt to transmit data by the electronic device might fail, but worse, the transmission attempt might cause the power to drop so low that the device powers off or resets, or enters some other unwanted state.

This is particularly problematic for IoT devices (e.g. sensors) with internal power supplies such as batteries and solar cells. The power supplied by such internal power supplies can vary depending on external environmental conditions, such as temperature and sunlight level and also as a result of aging of the power supply and mechanical damage. The state of charge, also referred to as charge level, of the internal power supply can also affect the degree to which changes to these external environmental factors affect the available power. Thus the power available from the internal power supply can vary over time across a wide range, meaning that sometimes the power available is insufficient for successful data transmission.

As a result, there are electronic devices that are arranged to detect if the condition of their power supply system is compromised, and to cease transmission in these conditions. The present invention seeks to provide improvements to such devices.

SUMMARY

From a first aspect, the invention provides a transmitter device, comprising:

a power supply;

a power supply assessment module, configured to assess a present power delivery capability of the power supply, wherein the present power delivery capability of the power supply is dependent on at least one external factor;

a transmission power assessment module, configured to assess a power required for successful transmission of a desired data transmission to an external communication party; and a data transmission module;

the transmitter device being further configured to compare the present power delivery capability of the power supply to the power required for successful transmission of the desired data transmission; and:

if the comparison indicates that the present power delivery capability of the power supply is sufficient for successful data transmission, initiating said desired data transmission from the data transmission module to the external communication party; and if the comparison indicates that the present power delivery capability of the power supply is not sufficient power for successful data transmission to the external communication party, not initiating said desired data transmission from the data transmission module to the external communication party.

The first aspect of the invention extends to a method of operating a transmitter device, comprising the transmitter device:

assessing a present power delivery capability of a power supply of the transmitter device, wherein the present power delivery capability of the power supply is dependent on at least one external factor;

assessing a power required for successful transmission of a desired data transmission to an external communication party;

comparing the present power delivery capability of the power supply to the power required for successful transmission of the desired data transmission; and:

if the comparison indicates that the present power delivery capability of the power supply is sufficient for successful data transmission, initiating said desired data transmission to the external communication party; and if the comparison indicates that the present power delivery capability of the power supply is not sufficient for successful data transmission to the external communication party, not initiating said desired data transmission to the external communication party.

Thus it will be seen that, in accordance with the invention, by arranging the transmitter device to compare the present power delivery capability of the power supply of the device with the power required for successful data transmission (i.e., in the particular transmission conditions), transmission of data can be enabled despite the power delivery capability of the power supply being temporarily reduced, e.g. because the external temperature is low, provided that the available power is still sufficient for successful transmission in the particular transmission conditions. Unlike in existing systems, simply detecting sub-optimal present (i.e. at the present time, current) power delivery capability of the power supply does not immediately prevent data transmission. Data may still be transmitted provided that the lower level of available power is sufficient for the particular data transmission conditions.

Thus, it will be understood that the power needed for successful transmission of a desired data transmission to an external communication party is assessed (e.g. calculated or estimated) in the current transmission conditions, i.e., the particular transmission conditions at the present time.

It will be appreciated that the present power delivery capability of a power supply, although related to the energy stored in the power supply (i.e. the charge level), is not the same as that energy. The power delivery capability of an energy source may depend on the internal resistance of the energy source and the internal resistance depends on external factors, such as temperature. A change in internal resistance will affect the power delivery capability, but not the charge level. Thus, an energy source having the same energy content at two different times may have a different power delivery capability at each of those times if the external conditions are different, (e.g. the temperature at the two times is different).

The present power delivery capability of the power supply is dependent on at least one external factor. It will therefore be understood that the present power delivery capability is not a measure of the state of charge of the power supply (i.e.

simply an internal condition), but rather is related to particular outside factors or conditions such as temperature which influence the available output power of the power supply at any given instant. However, it will furthermore be understood that the state of the charge of the battery may be indirectly relevant to the external factors, since the state of charge of the battery may affect the degree or extent to which the external factors influence the present power delivery capability of the power supply.

In some embodiments, the power supply is an energy storage device. For example, the power supply may be a battery.

In other embodiments, the power supply is an energy harvesting cell, for example a solar cell or a wind-powered cell. Thus, the at least one external factor may comprise a sunlight level, a wind strength, or other environmental conditions.

The internal resistance of the power supply may vary with temperature, such that the present power delivery capability of the power supply depends on an external temperature at, or in the vicinity of, the transmitter device. Thus, the at least one external factor may comprise temperature.

The transmitter device may further comprise a memory, storing one or more sets of reference data, each corresponding to an external factor, and storing data indicating how the external factor influences the present power delivery capability of the power supply, e.g. a graph of their relationship, or a lookup table.

In some embodiments the power supply assessment module further comprises a sensor for said external factor. This may allow the external (e.g. environmental) factor affecting the present power delivery capability of the power supply to be measured directly. The sensor may be a temperature sensor, a sunlight sensor, or a wind sensor for example.

The present power delivery capability of the power supply may depend on at least two factors, i.e. on another factor, in addition to the external factor. It may be based on at least a second factor, which may be external to the power supply or may be internal. As stated above, the state of charge of the battery may affect the degree or extent to which the external factors influence the present power delivery capability of the power supply. Thus, in other words, the present power delivery capability of the power supply may depend upon the state of charge of the power supply, in addition to, or in conjunction with, the at least one external factor. The power supply assessment module may further comprise a state-of-charge sensor for sensing the state of charge of the power supply.

Alternatively, or in addition, the external factor may be measured indirectly by detecting its effect on the present power delivery capability of the power supply. In some embodiments, the power supply assessment module comprises a voltage sensor. The power supply assessment module may be arranged to load the power supply with a known amount of power (e.g. an amount low enough that it can be provided even when the present power delivery capability of the power supply is reduced due to external factors), and measure the output voltage of the power supply. This will indicate whether the internal resistance of the power supply has increased due to environmental factors, thereby decreasing the present power delivery capability of the power supply.

In some embodiments, the transmitter device is arranged such that if the power supply assessment module indicates that the present power delivery capability is above a threshold, or is at its maximum, the transmitter device initiates data transmission without the power transmission assessment module assessing the power required for successful data transmission. Similarly, in some embodiments the transmitter device is arranged such that the transmission power assessment module is configured to assess the power required for successful data transmission to an external communication party only if the power supply assessment module indicates that the present power delivery capability is below a threshold, or below its maximum.

Similarly, the method may further comprise assessing the present power delivery capability of a power supply of the transmitter device, wherein the present power delivery capability of the power supply is dependent on at least one external factor; and:

if the power supply assessment module indicates that the present power delivery capability is above a threshold, or is at its maximum, initiating data transmission with the external communication party (i.e. without the power transmission assessment module assessing the power required for successful data transmission); and if the power supply assessment module indicates that the present power delivery capability is below a threshold, or below its maximum, assessing the power required for successful data transmission to an external communication party.

In some embodiments, the assessment of the power required for successful data transmission to an external communication party is based at least in part on a frequency band of data transmission and/or an external temperature at or in the vicinity of the transmitter device. This helps to take into account factors which can affect the amount of power, or the relative power level, which will be required for successful transmission of data.

In some embodiments, the assessment of the power required for successful data transmission to an external communication party is based at least in part on a previous signal received from the external communication party. This may allow the transmission power assessment module to estimate a level (e.g. high, medium or low), or an amount (e.g. a quantified value), of path loss in its communication with the external communication party, and therefore to estimate a level, or an amount, of power required for successful transmission. Thus, the method may further comprise the transmitter device receiving a reference signal from the external communication party (and optionally the external communication party transmitting the reference signal).

It will be understood therefore that the assessment of the power required for successful data transmission, and likewise the assessment of the present power delivery capability, need not be a calculation of a precise, quantified value, but rather may be a crude assessment, i.e. classifying the power into different levels or categories such as low, medium or high. There may be more or fewer than three categories. Thus, it will be understood that where the transmitter device compares the present power delivery capability of the power supply to the power required for successful data transmission to the external communication party, this need not be a comparison of two numerical values, to see if one "exceeds" the other (although it may be), but it could alternatively be comparing whether both lie in the same category, or which of the two is within a higher category or level. It is required only that the comparison allows the transmitter device to determine whether the power supply is able to supply sufficient power for successful data transmission to the external communication party at the particular, present, point in time.

In some embodiments, the power required for successful data transmission to the external communication party is partly or fully dictated by the external communication party. In other words, in some embodiments the data transmission module of the transmitter device is configured to operate in accordance with a protocol in which the external communication party partly or fully dictates the transmission power. For example, the external communication party may initiate a communication and require a response with a power level above a dictated minimum power level. In some embodiments, the data transmission module of the transmitter device is configured to operate in accordance with a protocol in which the external communication party requires obligatory re-transmission at a higher transmission power if a data transmission from the transmitter device is not successfully received by the external communication party. For example, in some embodiments the data transmission module is configured to transmit data in accordance with the LTE protocol, or other similar protocols. It will be understood that a protocol in which the external communication party partly dictates the transmission power may be one in which the transmitter device selects the power of initial transmission, and in which the external communication party requires obligatory re-transmission at a higher transmission power if a data transmission from the transmitter device is not successfully received by the external communication party. Thus, although the transmitter device selects the initial transmission power it may ultimately be dictated by the power supply, but only in some cases.

The invention as described above is particularly advantageous in this context, since in such protocols, where the transmission power is partly or fully dictated by the external communication party (e.g. as a result of obligatory re-transmission), the external communication party might ultimately require the transmitter device to transmit at a power which exceeds the present power delivery capability of the power supply, resulting in power-off or reset of the device. In the transmitter device described herein, the transmitter device can detect in advance whether it has sufficient power available for a given transmission. If there is insufficient power available, the transmitter device does not initiate the communication, thus preventing a scenario where the communication is initiated at a low power (which is within the present power delivery capability of the power supply), but ultimately re-transmission is required by the external communication party up to the point where eventually the power of the transmission exceeds the present power delivery capability of the power supply, and causes power-off of the transmitter device.

The transmitter device may partly or fully control the power at which the data transmission module initiates a data transmission. In some embodiments, the transmitter device (e.g. the data transmission module) may be arranged to set the power at which the data transmission module initiates a data transmission based on the assessment by the transmission power assessment module of the power required for successful data transmission to an external communication party. This may advantageously help the transmitter device to avoid repeated data transmissions to the external communication party, by beginning transmissions at a power level which is expected to be successful, but also may help to conserve power by preventing transmission at a much higher power level than is required for successful transmission.

The transmitter device is configured to compare the present power delivery capability of the power supply to the power required for successful data transmission to the external communication party. It will be understood that any suitable module within the transmitter device may carry out this comparison, for example the power supply assessment module, the transmission power assessment module, or the data transmission module.

In some embodiments, if the comparison indicates that the present power delivery capability of the power supply is such that the power supply is not able to supply sufficient power for successful data transmission to the external communication party, the transmitter device is configured to wait for predetermined time period, and then to assess, by the power supply assessment module, a new present power delivery capability of the power supply, and to assess by the transmission power assessment module, the new power required for successful data transmission to the external communication party, and to compare the new present power delivery capability of the power supply to the new power required for successful data transmission to the external communication party; and:

if the comparison indicates that the new present power delivery capability of the power supply is such that the power supply is able to supply sufficient power for successful data transmission to the external communication party, initiating data transmission from the data transmission module to the external communication party; and if the comparison indicates that the new present power delivery capability of the power supply is such that the power supply is not able to supply sufficient power for successful data transmission to the external communication party, not initiating data transmission from the data transmission module to the external communication party. Thus it will be understood that the transmitter device may be arranged to wait for a predetermined amount of time, and then repeat the process of assessment and comparison at a later time, to establish whether data transmission is then possible.

In some embodiments, the transmitter device further comprises a notification module, wherein if the comparison indicates that the present power delivery capability of the power supply is such that it is not able to supply sufficient power for successful data transmission to the external communication party, the notification module is configured to output a notification indicating that present power delivery capability is insufficient for data transmission. The notification may be, for example, a message on a display, a sound, a vibration of the transmitter device, or a light emitted by the transmitter device. The notification may provide an indication to a user of the transmitter device that the device needs to be moved to a location with better reception so that path loss is decreased or present power delivery capability of power supply is improved e.g. where there is more direct sunlight or the temperature is warmer.

The transmitter device could transmit light or sound waves. In some embodiments, the transmitter device is a radio transmitter. It will be understood that the transmitter device may also act as a receiver—i.e. it could be a transceiver.

According to a second aspect, the invention provides a communication network comprising a transmitter device and an external communication party. The transmitter device may have any of the features as laid out above. In some embodiments the external communication party is arranged to partly or fully dictate the power required for data transmission. In some embodiments the external communication requires obligatory re-transmission at a higher transmission power if a data transmission from the transmitter device to the external communication party is not successfully received.

In some embodiments the external communication party is a cellular base station, optionally an LTE eNodeB base station.

In some embodiments, the external communication party is arranged to transmit a reference signal to the transmitter device, from which the power required for successful data transmission to an external communication party may be assessed.

Features of any aspect or embodiment described herein may, wherever appropriate, be applied to any other aspect or embodiment described herein. Where reference is made to different embodiments or sets of embodiments, it should be understood that these are not necessarily distinct but may overlap. It will furthermore be understood that references made to a method comprising a step correspondingly extend to a module "configured to" carry out a step, and vice versa.

BRIEF DESCRIPTION OF THE DRAWINGS

An embodiment of the invention will now be described, by way of example only, with reference to the accompanying drawings, in which.

DETAILED DESCRIPTION

Figure 1:
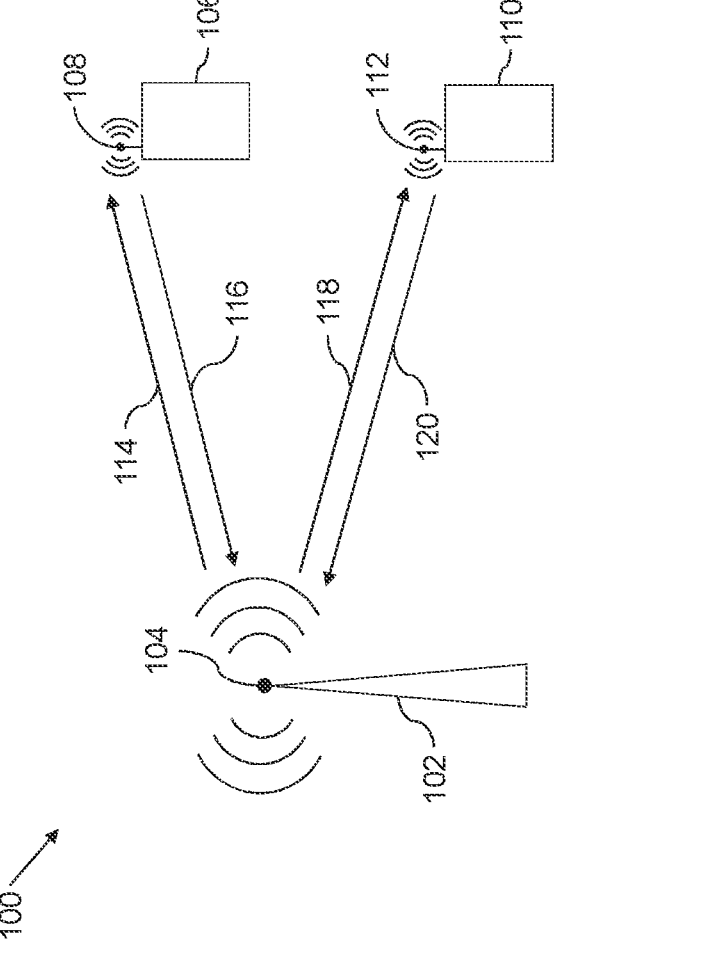
FIG. 1 is a schematic diagram of an exemplary communications network in accordance with an embodiment of the present invention.

FIG. 1 shows a schematic diagram of an exemplary radio communications network 100. The network 100 includes a base station radio transceiver 102, a first user equipment (UE) radio transceiver 106, and a second UE radio transceiver 110. The base station 102, first UE 106 and second UE 110 each comprise a respective antenna 104, 108, 112 for transmission and receipt of wireless radio signals.

The base station 102 is in wireless radio communication with each UE 106, 110, and can thus transmit wireless signals to, and receive wireless signals from, each UE 106, 110. In order to transmit information to the first UE 106, the base station 102 transmits using its antenna 104 a first downlink signal 114 which is addressed to the first UE 106, and the first UE 106 receives this first downlink signal 114 using its antenna 108. Similarly, the base station 102 also transmits using its antenna 104 a second downlink signal 118 which is addressed to the second UE 110, and the second UE 110 receives this second downlink signal 118 using its antenna 112.

In order to transmit information to the base station 102, the first UE 106 transmits using its antenna 108 a first uplink signal 116 which is addressed to the base station 102, and the base station 102 receives this first uplink signal 116 using its antenna 104. Similarly, the second UE 110 transmits using its antenna 112 a second uplink signal 120 which is addressed to the base station 102, and the base station 102 receives this second uplink signal 120 using its antenna 104.

The base station 102 and UEs 106, 110 are configured to operate in accordance with a predetermined communication protocol—which in this particular embodiment is LTE, though the principles outlined herein are not limited to LTE and may be equally applied to other predetermined communication protocols e.g. Wi-Fi, Bluetooth, 3GPP 4G, etc.

In the LTE protocol, if one of the UEs 106, 110 attempts to transmit data to the base station 102, and this communication is unsuccessful—i.e. the UE 106, 110 does not receive an acknowledgement message from the UE 106, 110 is required to repeat the transmission at a higher transmission power. This process is repeated, with incrementally increasing transmission powers, until the transmission of data to the base station 102 is successful. This has the effect that ultimately the transmission power is dictated by the base station 102. As a result, it is possible that the base station 102 could ultimately require the UE 106, 110 to transmit at a power which exceeds a power delivery capability of the power supply, resulting in power-off or reset of the device.

It will be appreciated that the base station 102 and the UEs 106, 110 may include additional electronic components that are not shown in FIG. 1, including but not limited to radio transmission/reception circuitry, amplifiers, filters, analogue-to-digital converters (ADCs), digital-to-analogue converters (DACs), processors, memory, storage, etc. Furthermore, the network 100 is not limited to a single base station 102 and two UEs 106, 110 as shown in FIG. 1—the network 100 may comprise any number of base stations and UEs.

Figure 2:
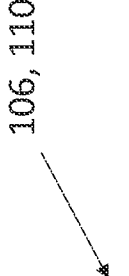
FIG. 2 is a schematic diagram of an exemplary transmitter device in accordance with an embodiment of the present invention.
Figure 2:
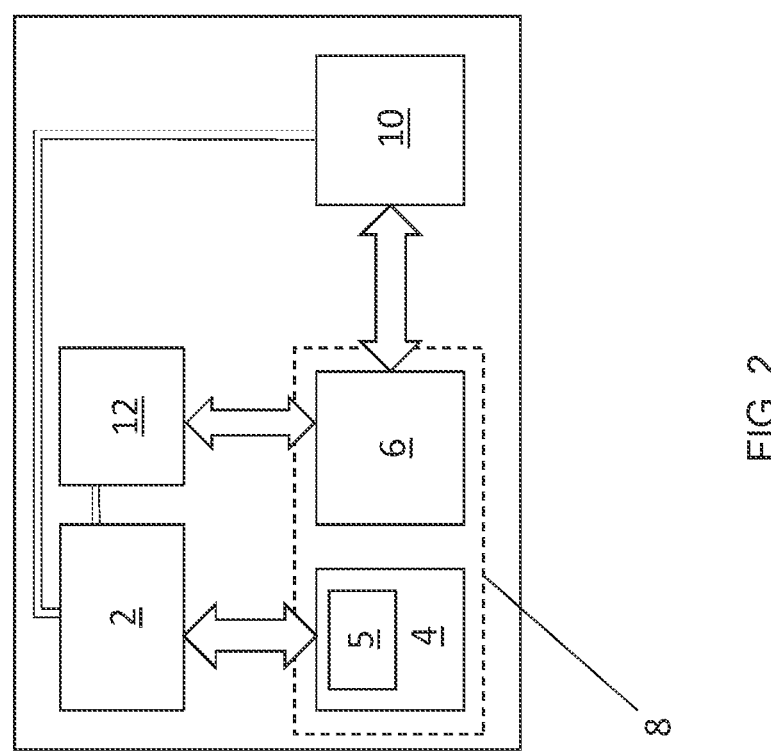

FIG. 2 is a schematic diagram showing one of the UEs 106, 110, shown in FIG. 1, in greater detail. The UEs are referred to herein by the term "radio transmitter device".

The radio transmitter device 106, 110 includes a power supply 2. In this example the power supply 2 is an energy storage device, in particular a battery. As will be explained with reference to FIG. 3, the internal resistance of the battery varies with temperature. The power supply 2 supplies power to a notification module 12, and a data transmission module 10, discussed further below. The data transmission module may be, or comprise, the antenna 108, 112, shown in FIG. 1.

The radio transmitter device 106, 110 further includes a power supply assessment module 4, which includes a sensor 5, and a transmission power assessment module 6. The power supply assessment module 4 and the transmission power assessment module 6, may be separate, or may both be part of (or provided by) a single power assessment module 8, as represented by the dashed line around them both. In practice both may be implemented as part of a system on chip integrated circuit.

Figure 3:
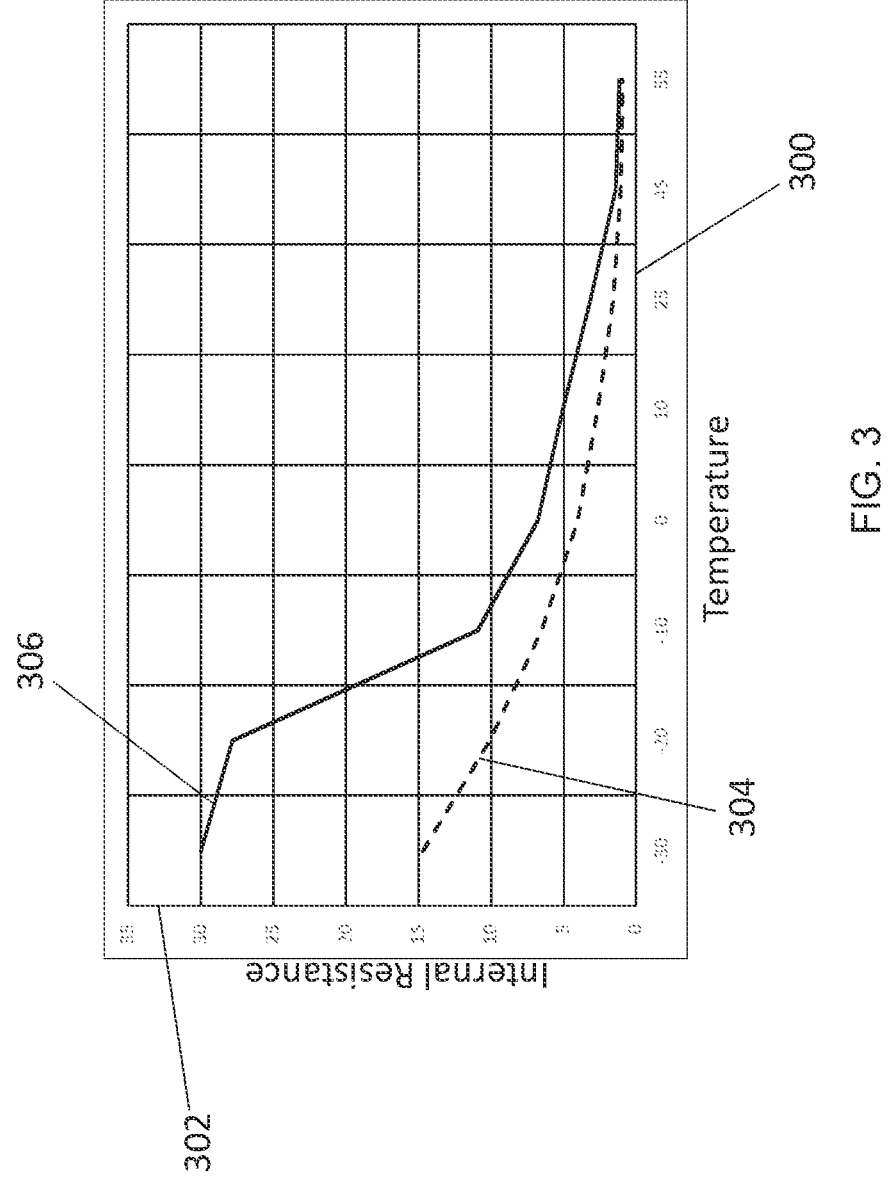
FIG. 3 is a graph illustrating an example of a relationship between temperature and internal resistance for a battery, at two different states of charge of the battery.

In this example, the sensor 5 is a temperature sensor. The power supply assessment module 4 detects temperature, using the temperature sensor 5. As illustrated in the graph of FIG. 3, the internal resistance of the battery 2 varies depending on the temperature of the environment in which the battery is placed. The graph of FIG. 3 has temperature on the x-axis 300, in units of degrees Celsius (° C.) and internal resistance on the y-axis 302 in units of Ohms. The dashed line 304 shows the relationship between temperature and internal resistance when the battery is at a state of charge of 100%. The solid line 306 shows the relationship between temperature and internal resistance when the battery is at a state of charge of 5%. It can be seen that the relationship between internal resistance and temperature is itself dependent on the state of charge of the battery. In both cases the internal resistance rises significantly as the battery gets colder, but when its charge is low, the rise is much steeper.

Figure 4:
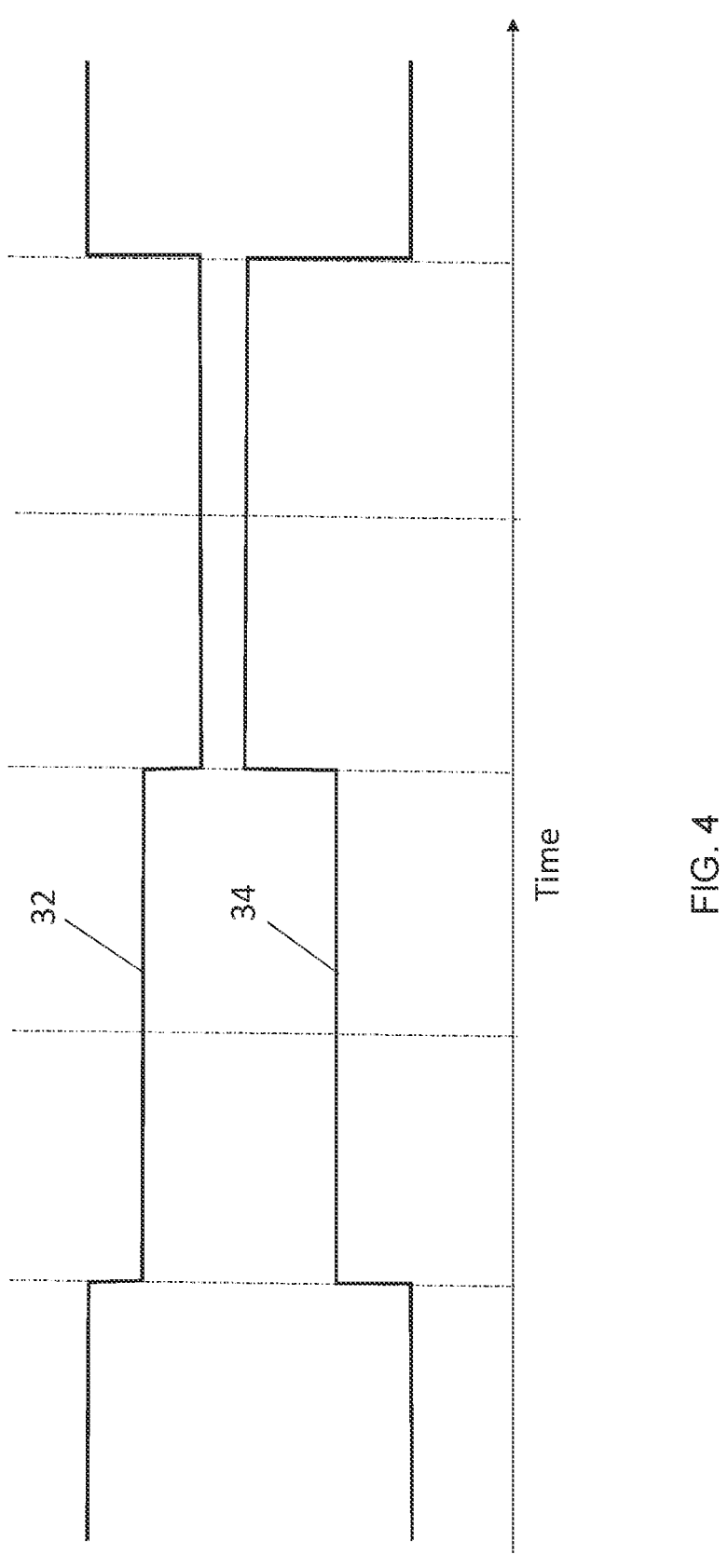
FIG. 4 is a schematic plot illustrating changes, over time, of an external factor affecting present power delivery capability, and of power supply internal resistance.

Therefore, if temperature varies over time, so too will internal resistance of the battery 2, and therefore its power delivery capability. This is further illustrated in FIG. 4, which is a schematic plot showing how an external condition 32, in this example temperature, and a power supply internal resistance 34, both change over time.

In light of the relationship shown in FIG. 3, it will be appreciated that measuring temperature using sensor 5 can be used to indirectly measure the power delivery capability of the battery 2, at a given "present" time. Alternatively, in an example not illustrated, the sensor may be a voltage sensor and may directly measure the voltage of the power supply 2 for a load of known power, therefore giving a direct indication of the internal resistance of the power supply 2 (and therefore an indirect measure of external factors which affect the power delivery capability of the power supply).

This measurement by the sensor 5 may provide an exact quantity indicating the present power delivery capability of the power supply, or a general indication of whether the power delivery capability is good or poor, e.g. a broad power level rather than a precise power value.

As illustrated in FIG. 3, the effect of temperature on the present power delivery capability is dependent upon the present state of charge of the battery. In this example, the power supply assessment module 4 also measures the state of charge of the power supply 2. This helps to more accurately determine the present power delivery capability of the power supply 2. For example, different lookup tables giving the present power delivery capability based on temperature could be used, where the choice of lookup table is based on the determined state of charge.

The transmission power assessment module 6 assesses the power required for successful data transmission to the base station 102. The transmission power assessment module 6 may assess this based on a previous signal received from the base station 102, since this may indicate path loss for the data transmission. Alternatively, or in addition, it may be worked out based on measured factors such as the frequency intended to be used for data transmission and/or the temperature. It may be assessed by comparing these (or other) parameters to reference data, e.g. in a lookup table.

The result of this assessment may be an exact quantity indicating the power required for successful data transmission to the base station 102, or a general indication of whether the power required for successful data transmission is low or high.

The radio transmitter device 106, 110, then compares the present power delivery capability of the power supply 2 to the power required for successful data transmission to the base station 102. This comparison can be better visualised with reference to FIG. 5.

Figure 5:
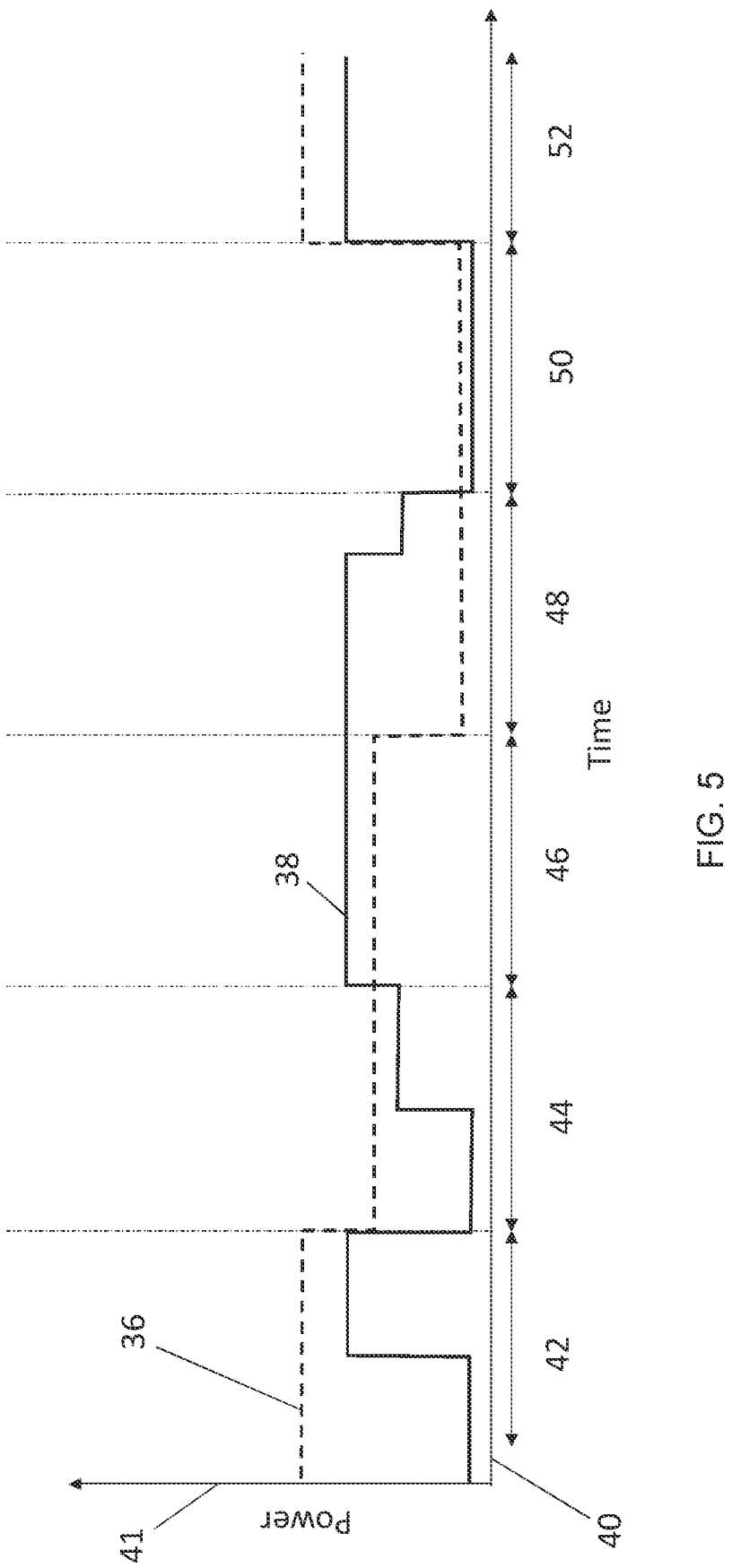
FIG. 5 is a graph illustrating changes, over time, of a power delivery capability of a power supply, and of a power level required for successful data transmission to an external communication party.

FIG. 5 is a graph showing time along the x-axis 40, and power along the y-axis 41. The y-axis 41 could represent precise quantified power values, or could simply illustrate a relative measure of power level. The solid line 38 shows how the power level for successful data transmission with the base station 102 varies over time in a particular example. This might be affected by changes in path loss, temperature, or transmission frequency, amongst many other factors. The dashed line 36 shows how the power delivery capability of the power supply 2 could vary over time. This is affected by various external factors, as discussed above, including temperature.

The time axis 40 has been divided up into a series of time periods 42, 44, 46, 48, 50 and 52, during which different conditions persist. These will be described below.

In the first time period 42 the power delivery capability 36 at that time is high. This level is higher than all of the levels of power ever required for successful data transmission, and therefore the radio transmitter device 106, 110 can be certain that transmission will be successful (or at least that it will not fail for power-related reasons), even without checking the power required for successful transmission. This is likewise the case during the sixth time period 52. In these time periods even a radio transmitter device not implementing the present invention will carry out power transmission, since no loss of power would be detected.

In the second time period 44 the power delivery capability 36 of the power supply has dropped, as a result of a drop in temperature of the environment in which the radio transmitter device 106, 110 is located. In some prior art devices, the detection of a drop in the present power delivery capability, or of a sub-optimal condition of the power supply, would result in immediate ceasing of data transmissions. Thus no data transmission would occur in the second time period 44, and similarly in the fourth time period 50.

However, in accordance with the present invention, the radio transmitter device 106, 110 compares the power level for successful data transmission 38 with the present power delivery capability 36. In these time periods 44, 50, the radio transmitter device 106, 110, finds that there is sufficient power for successful data transmission from the data transmission module 10 to the base station 102, and therefore data transmission is initiated. In fact, the particular power used for the initial data transmission is selected to be close, or equal to, the determined power level needed for successful data transmission.

In time periods 46 and 48, the comparison determines that the power level needed for successful data transmission 38 exceeds the power delivery capability 36 of the power supply, and therefore data transmission from the data transmission module 10 to the base station 102 is not initiated. If data transmission were initiated in this state, started at a low power, the base station 102 would keep requiring re-transmission of the data. In the conditions of time periods 46 and 48 the power level needed for successful data transmission is not achievable by the power supply 2. Therefore, if the invention were not present and data transmission was initiated, the base station 102 would keep requiring re-transmission at higher and higher powers until the transmission power exceeded the present power delivery capability of the power supply 2, and a switch off or reset of the device occurred as a result. Instead, since the invention is present and prevents transmission from being initiated, the radio transmitter device 106, 110 waits for a predetermined amount of time, and then re-assesses the power delivery capability at the later time, and reassesses the power level for successful data transmission. A new comparison is carried out and if it indicates sufficient power is available then the data transmission is carried out, at the later time.

Additionally, when the comparison indicates insufficient power (i.e. in time periods 46, 48), the radio transmitter device 106, 110 provides a notification to the user using the notification module 12, to indicate that there is insufficient power. The notification may be, for example, a message on a display, a sound, a vibration of the radio transmitter device, or a light emitted by the radio transmitter device. The notification may provide an indication to a user of the radio transmitter device that the device needs to be moved to a place where path loss is decreased or present power delivery capability of power supply is improved e.g. where there is more direct sunlight or the temperature is warmer.

Figure 6:
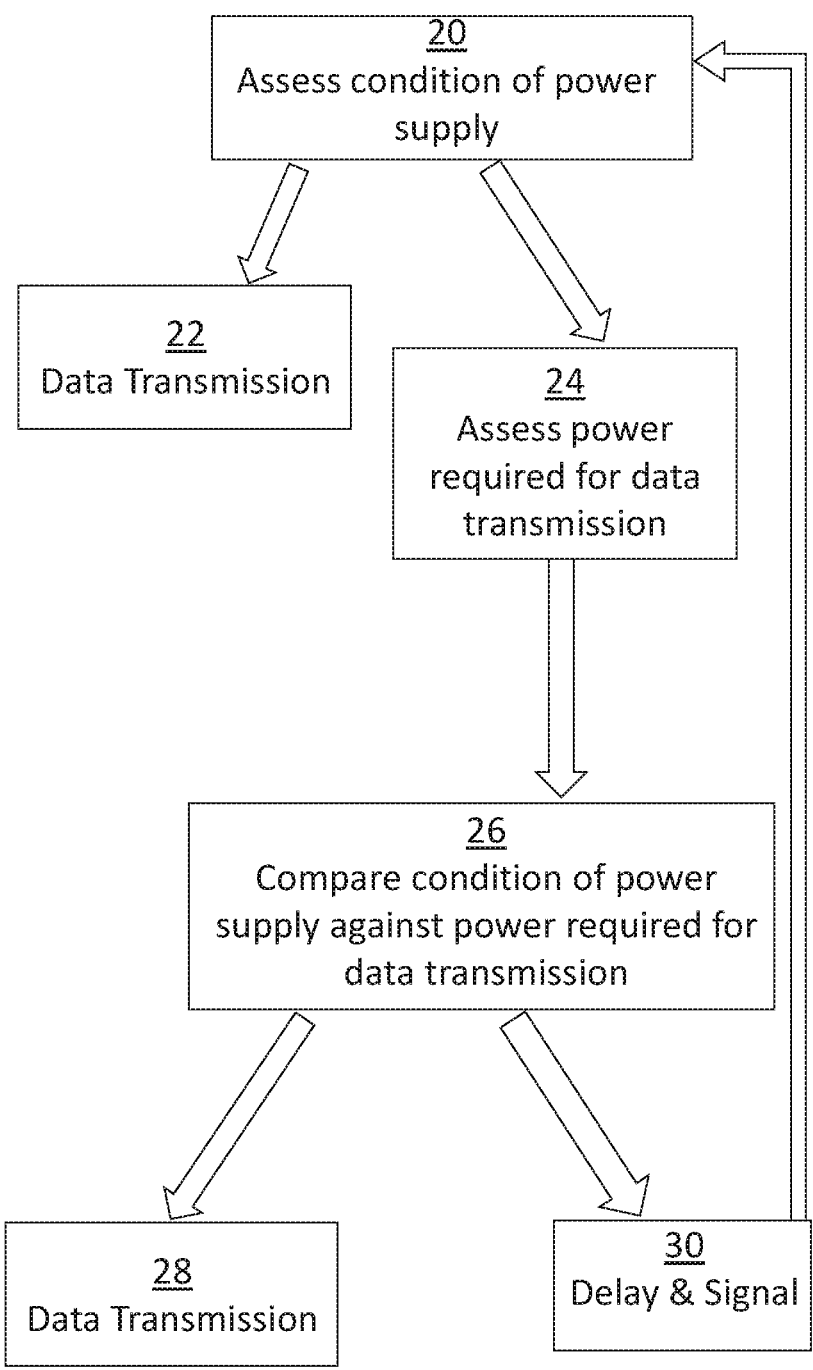
FIG. 6 is a flow chart illustrating a method in accordance with an embodiment of the present invention.

The method described above is further illustrated in the flow chart of FIG. 6. The method contains the following steps:

Firstly, at step 20, the radio transmitter device assesses the present power delivery capability of a power supply 2 of the radio transmitter device. If, at step 20, it is determined that the power delivery capability is high, or at its maximum, then the radio transmitter device 106, 110 proceeds to step 22, at which data transmission is initiated.

However, if at step 20 the present power delivery capability is determined to be less than a certain value, or below its maximum, the method proceeds to step 24. At step 24 the radio transmitter device 106, 110 assesses the power required for successful data transmission to the base station 102, as described above.

Then, at step 26, the radio transmitter device 106, 110 compares the present power delivery capability of the power supply 2 to the power required for successful data transmission from the data transmission module 10 to the base station 102.

If the comparison indicates that the present power delivery capability of the power supply 2 is such that the power supply 2 is able to supply sufficient power for successful data transmission to the base station 102, the method proceeds to step 28 and data transmission from the data transmission module 10 to the base station 102 is initiated.

Alternatively, if the comparison indicates that the present power delivery capability of the power supply 2 is such that the power supply 2 is not able to supply sufficient power for successful data transmission to the base station 102, then the method proceeds to step 30. At step 30, data transmission from the data transmission module is not initiated. A notification is issued from notification module 12, as described above. The radio transmitter device 106, 110 also waits, in step 30, for a defined delay period, and then returns to step 20 and repeats the process again.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A transmitter device, comprising:
   a power supply;
   a power supply assessment module, configured to assess a present power delivery capability of the power supply, wherein the present power delivery capability of the power supply is dependent on at least one external factor;
   a transmission power assessment module, configured to assess a power required for successful transmission of a desired data transmission to an external communication party in the particular transmission conditions; and
   a data transmission module;
   the transmitter device being further configured to compare the present power delivery capability of the power supply to the power required for successful transmission of the desired data transmission; and:
      if the comparison indicates that the present power delivery capability of the power supply is sufficient for successful data transmission, initiating said desired data transmission from the data transmission module to the external communication party; and
      if the comparison indicates that the present power delivery capability of the power supply is not sufficient for successful data transmission to the external communication party, not initiating said desired data transmission from the data transmission module to the external communication party.

2. The transmitter device of claim 1, wherein the power supply is a battery or an energy harvesting cell.

3. The transmitter device of claim 1, wherein the assessment of the power required for successful data transmission to an external communication party is based at least in part on an external temperature at or in the vicinity of the transmitter device.

4. The transmitter device of claim 1, wherein the power supply assessment module further comprises a sensor for said external factor.

5. The transmitter device of claim 1, wherein the power supply assessment module comprises a voltage sensor.

6. The transmitter device of claim 1, wherein the transmitter device is arranged such that the transmission power assessment module is configured to assess the power required for successful data transmission to an external communication party only if the power supply assessment module indicates that the present power delivery capability is below a threshold, or below its maximum.

7. The transmitter device of claim 1, wherein the assessment of the power required for successful data transmission to an external communication party is based at least in part on a frequency band of data transmission.

8. The transmitter device of claim 1, wherein the assessment of the power required for successful data transmission to an external communication party is based at least in part on a previous signal received from the external communication party.

9. The transmitter device of claim 1, wherein the data transmission module of the transmitter device is configured to operate in accordance with a protocol in which the external communication party partly or fully dictates the transmission power.

10. The transmitter device of claim 9, wherein the data transmission module of the transmitter device is configured to operate in accordance with a protocol in which the external communication party requires obligatory re-transmission at a higher transmission power if a data transmission from the transmitter device is not successfully received by the external communication party.

11. The transmitter device of claim 10, wherein the transmitter device is arranged to set the power at which the data transmission module initiates a data transmission based on the assessment by the transmission power assessment module of the power required for successful data transmission to an external communication party.

12. The transmitter device of claim 1, wherein if the comparison indicates that the present power delivery capability of the power supply is such that the power supply is not able to supply sufficient power for successful data transmission to the external communication party, the transmitter device is configured to wait for a predetermined time period, and then to assess, by the power supply assessment module, a new present power delivery capability of the power supply, and to assess by the transmission power assessment module, the new power required for successful data transmission to the external communication party, and to compare the new present power delivery capability of the power supply to the new power required for successful data transmission to the external communication party; and:
      if the comparison indicates that the new present power delivery capability of the power supply is such that the power supply is able to supply sufficient power for successful data transmission to the external communication party, initiating data transmission from the data transmission module to the external communication party; and if the comparison indicates that the new present power delivery capability of the power supply is such that the power supply is not able to supply sufficient power for successful data transmission to the external communication party, not initiating data transmission from the data transmission module to the external communication party.

13. The transmitter device of claim 1, wherein the transmitter device further comprises a notification module, wherein if the comparison indicates that the present power delivery capability of the power supply is such that it is not able to supply sufficient power for successful data transmission to the external communication party, the notification module is configured to output a notification indicating that power is insufficient for data transmission.

14. A communication network comprising a transmitter device as claimed in claim 1, and further comprising an external communication party.

15. A method of operating a transmitter device, comprising the transmitter device:

assessing a present power delivery capability of a power supply of the transmitter device, wherein the present power delivery capability of the power supply is dependent on at least one external factor;

assessing a power required for successful transmission of a desired data transmission to an external communication party in the particular transmission conditions;

comparing the present power delivery capability of the power supply to the power required for successful transmission of the desired data transmission; and if the comparison indicates that the present power delivery capability of the power supply is sufficient for successful data transmission, initiating said desired data transmission to the external communication party; and if the comparison indicates that the present power delivery capability of the power supply is not sufficient for successful data transmission to the external communication party, not initiating said desired data transmission to the external communication party.

16. The method of claim 15, wherein assessing the present power delivery capability of a power supply of the transmitter device comprises taking a measurement using a sensor.

17. The method of claim 15, further comprising assessing the present power delivery capability of a power supply of the transmitter device, wherein the present power delivery capability of the power supply is dependent on at least one external factor; and:

if the power supply assessment module indicates that the present power delivery capability is above a threshold, or is at its maximum, initiating data communication with the external party; and if the power supply assessment module indicates that the present power delivery capability is below a threshold, or below its maximum, assessing the power required for successful data transmission to an external communication party.

18. The method of claim 15, wherein initiating data communication with the external communication party comprises setting the initial transmission power for initiating communication based on the assessment by the transmission power assessment module of the power required for successful data transmission to an external communication party.

19. The method of claim 15, wherein if data communication with the external communication party is not initiated, the method further comprising waiting for a predetermined time period, and then repeating the method.

20. The method of claim 15, wherein if data communication with the external communication party is not initiated, the method further comprising outputting a notification indicating that power is insufficient for data transmission.

* * * * *